Nov. 2, 1971    B. SMITH    3,616,523

GLASS LASER WINDOW SEALANT TECHNIQUE

Filed Nov. 24, 1970

INVENTOR,
BERNARD SMITH

BY: Daniel Sharp
Harry M. Saragovitz,
Edward J. Kelly & Herbert Berl

ATTORNEYS

United States Patent Office 3,616,523
Patented Nov. 2, 1971

3,616,523
GLASS LASER WINDOW SEALANT TECHNIQUE
Bernard Smith, Neptune, N.J., assignor to the United
States of America as represented by the Secretary of the
Army
Filed Nov. 24, 1970, Ser. No. 92,392
Int. Cl. B23k 31/02
U.S. Cl. 29—472.7
8 Claims

ABSTRACT OF THE DISCLOSURE

A technique for sealing electrically non-conductive optical windows to electrically non-conductive electron discharge device envelopes, such as laser bodies, without distorting or destroying the optical properties of the window, particularly during sealing-in process at temperatures often in excess of about 350 degrees C. The technique involves optically polishing the mating surfaces of the window and the body, coating said surface or edge of the body with a thin electrically conductive or semiconductive sealant, placing the window over the aforesaid edge and applying a high unidirectional potential between the sealant and the window while heating the body and window in an oven to a high temperature which is below the softening temperature for the window and body.

---

The invention described herein may be manufactured, used and licensed by or for the Government for governmental purposes without the payment to me of any royalty thereon.

In the construction of electron discharge devices such as lasers, it is desirable to provide a mechanically strong, vacuum-tight seal between the optical window of the laser and the non-conductive laser body without destroying the optical properties of either the window or laser body and unduly increasing the leakage through the laser envelope. With present laser sealing techniques, such seals have been incapable of withstanding bake-outs at the temperatures exceeding 400 degrees C. necessary for proper outgassing of the laser envelope. For example, epoxies which are now used at relatively low temperatures for sealing the optical window to the body are not able to withstand these bake-out temperatures and still maintain their vacuum integrity.

In accordance with the invention, a sealing technique has been devised which will form seals that are mechanically strong and vacuum-tight at elevated temperature so as to permit thorough outgassing and, in the case of gas lasers, vacuum processing of the laser envelope prior to back-filling with the desired laser gas or gases. This technique will result in improved laser operation since the composition of undesirable gases which have been absorbed by the laser body can be reduced to a minmum, if not completely eliminated.

The technique according to the invention involves polishing the surfaces of the optical window and of the laser body to be joined to a surface finish of the order of 1 to 4 microns, depositing a layer of approximately two mils thickness of an electrically conductive or semiconductive sealant to said surface of the laser body, placing the window over the sealant-coated surface of the laser body and heating the assembly in an oven to a temperature of from about 350 to 850 degrees C., depending upon the material, which is below the deformation temperature of both the window and the laser body, while applying a unidirectional voltage of at least 800 volts between the window and the sealant for approximately two minutes to provide an electrostatic field between the window and sealant which results in a strong attractive force being exerted between the window and the sealant. The composition of the sealant will depend upon the oven atmosphere in which the seal is to be made. The oven temperature, voltage, and surface finish are inter-related factors, so that the voltage and temperature, for example, are each a function of the smoothness of the surfaces of the laser body and the window.

Figure 1:
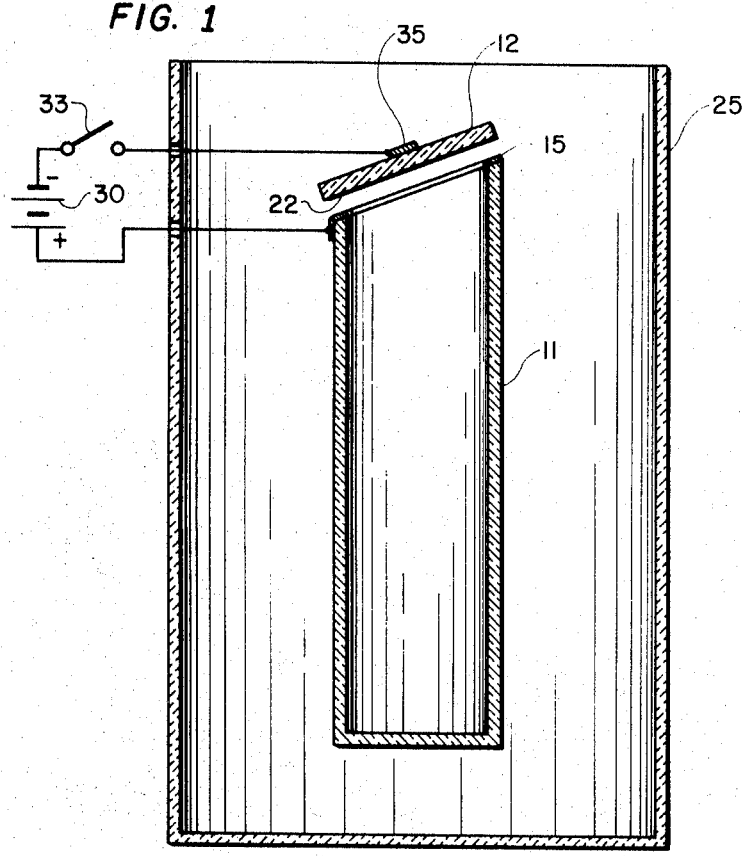
FIG. 1 is a view illustrating the manner in which the method of the invention can be accomplished.

Referring to FIG. 1, a laser body 11, which together with a window 12, forms the laser envelope, is shown; this laser envelope may be used for any type of laser, such as any one of several gas lasers, or a laser enclosing a solid lasing medium, such as a ruby rod. One or both ends of the laser body 11 may be cut at the Brewster angle, in accordance with well known laser design principles. The laser body 11 normally is made of an optically transparent material such as quartz, Pyrex glass or the like; because of its somewhat greater transparency in the usual laser frequency operating range, quartz is most often used. The same electrically non-conductive materials may be used for the optically transparent window 12.

Figure 2:
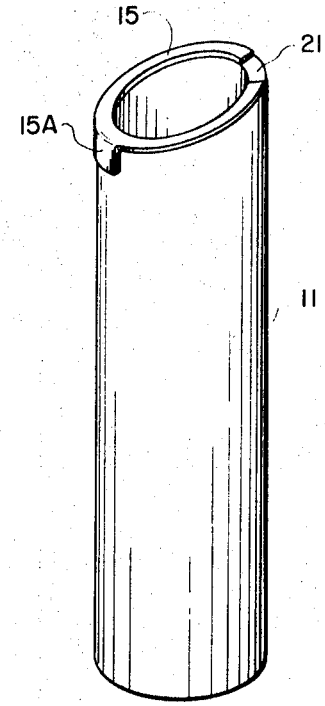
FIG. 2 is a detail view further illustrating the technique shown in FIG. 1.

The first step in the sealing technique of the invention is to optically polish the surface 21 of the laser body 11 and the edge or surface 22 of window 12 to a surface finish of about 1 to 4 microns, depending upon the material. For a softer material, such as 7052 FN glass, the surface finish can be of the order of 3 to 4 microns; in the case of a harder material, such as quartz, the surface finish must be smoother, for example, of the order of 2 microns. This polishing includes a preliminary lapping of the surfaces until they are flat. After optically polishing the surfaces 21 and 22 to be adjoined, the edge or surface 21 of laser body 11 is coated with a thin contiguous electrically conductive or semiconductive coating 15. Selection of the proper coating 15 is dependent upon the atmosphere in which the final seal is to be made. For example, silicon has been used for the coating 15 in the presence of air and a metal such as copper or nickel has been used when sealing occurs in the presence of an inert environment. The thickness of the electrically conductive coating 15 should be approximately two mils. This coating may be applied by sputtering or by other usual methods of deposition. After coating the end 21 of the laser body 11 which is to be in intimate contact with optically transparent window 12, the window 12 is placed over the coated laser body. A unidirectional source of high voltage 30 is connected through a switch 33 to an electrode 35 deposited on the window 12 and to a tab portion 15A formed by depositing an extension of the coating 15 along the outer wall of the laser body 11, as shown in FIG. 2. The laser body 11, with the window 12 resting upon surface 21 thereof, is now positioned in an oven 25 and the temperature is raised to about 850 degrees C. in the case of quartz or to about 350 degrees C. in the case of the boro-silicate glass 7052 FN; the proper oven temperature should be well below the softening point of the window 12 so as not to distort any of its optical properties. The temperature is a function, not only of the material, but also of the surface finish of surfaces 21 and 22 and can be decreased as the smoothness of said surfaces is increased. Once the selected temperature has been reached the voltage from source 30 is applied by closing switch 33; the magnitude of this voltage depends upon the material being sealed, the surface finish, and the ambient temperature of the sealing oven 25. The voltage is generally in the range of from 800 volts to 2000 volts and this voltage is maintained for approximately two minutes. Temperature, applied voltage and surface finish are interrelated parameters. For quartz, the surface finish is approximately 2 microns, the operating temperature approximately 850 degrees C. and the voltage substantially 1500 volts. For the boro-silicate glass 7052 FN, typical values for the above parameters are 3 to 4 microns, 350 degrees C. and 800 volts.

Figure 3:
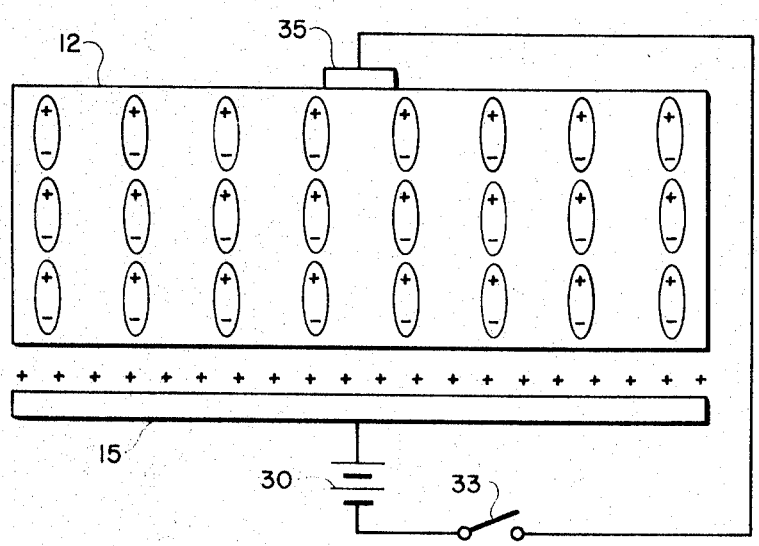
FIG. 3 is a view showing the electrostatic field existing between the window and the laser body during the sealing process.

The high voltage results in an electrostatic field between the conductive seal 15 and the electrode 35 with the molecules in the dielectric window 12 being polarized in FIG. 3 and with a positive charge on the metal plate as indicated in FIG. 3. This electrostatic field causes the window 12 to be attracted towards the sealant 15 and a force thus is exerted between the window 12 and sealed edge of body 11 which contributes substantially to the bonding or sealing action. After removal of this connection of the high voltage from the laser assembly 11, 12, 15 and upon cooling to safe handling temperatures, the laser assembly is removed from the oven 25. One then obtains a seal which is mechanically strong and vacuum-tight and capable of withstanding bake-outs in excess of 400 degrees without damaging the seal or, in the case of gas lasers, without adversely effecting the final purity of the laser gas fill. Furthermore, the optical properties of the window are not affected at the stated sealing temperature, which, in the case of quartz, is approximately 850 degrees C.

While the invention has been described in connection with an illustrative embodiment, obvious modifications thereof are possible without departing from the spirit of the invention. Accordingly, the invention should be limited only by the scope of the appended claims.

What is claimed is:

1. A method of sealing an electrically non-conductive optical window to an electrically non-conductive envelope of an electron discharge device comprising the steps of optically polishing the surfaces of said window and said envelope to be joined, applying to said suruface of said envelope a coating of a sealant which is electrically conductive, placing said window on said coated surface of said envelope, and heating the assembly of said window and said envelope while applying a high unidirectional voltage between said window and said sealant.

2. A method of sealing an electrically non-conductive optical window to an electrically non-conductive envelope of an electron discharge device, said window and envelope being made of the same material and selected from the group consisting of quartz and 7052 FN boro-silicate glass, comprising the steps of optically polishing the surfaces of said window and said envelope to be joined to a surface finish of 1 to 4 microns, applying to said surface of said envelope a coating of approximately 2 mils of a sealant which is electrically conductive, placing said window on said coated surface of said envelope, and heating the assembly of said window and said envelope to a temperature of from 350 degrees C. to 850 degrees C. while applying a high unidirectional voltage of from 800 volts to 1500 volts between said window and said sealant for approximately 2 minutes.

3. A method of sealing an electrically non-conductive optical window to an electrically non-conductive envelope of an electron discharge device, said window and envelope being made of quartz, comprising the steps of optically polishing the surfaces of said window and said envelope to be joined to a surface finish of approximately 2 microns, applying to said surface of said envelope a coating of approximately 2 mils of a sealant which is electrically conductive, placing said window on said coated surface of said envelope, and heating the assembly of said window and said envelope substantially to a temperature of 850 degrees C. while applying a high unidirectional voltage of approximately 1500 volts between said window and said sealant for approximately 2 minutes.

4. A method of sealing an electrically non-conductive optical window to an electrically non-conductive envelope of an electron discharge device, said window and envelope being made of type 7052 FN boro-silicate glass comprising the steps of optically polishing the surfaces of said window and said envelope to be joined to a surface finish of approximately 3 microns, applying to said surface of said envelope a coating of approximately 2 mils of a sealant which is electrically conductive, placing said window on said coated surface of said envelope, and heating the assembly of said window and saidd envelope substantially to a temperature of 350 degrees C. while applying a high unidirectional voltage of approximately 800 volts between said window and said sealant for approximately 2 minutes.

5. A method of sealing according to claim 2 wherein said sealant is a metal and said heating is accomplished in an inert environment.

6. A method of sealing according to claim 2 wherein said sealant is silicon and said heating is accomplished in an oven containing air.

7. A method of sealing according to claim 3 wherein said sealant is a metal and said heating is accomplished in an inert oven environment.

8. A method of sealing according to claim 3 wherein said sealant is silicon and said heating is accomplished in an oven containing air.

References Cited

UNITED STATES PATENTS 3,256,598   6/1966   Kramer et al. _____ 29—497.5

FOREIGN PATENTS 917,416   2/1963   Great Britain _____ 29—472.7

JOSEPH V. TRUHE, Primary Examiner

J. G. SMITH, Assistant Examiner

U.S. Cl. X.R.

29—497.6; 219—85